(12) United States Patent
Lalwani et al.

(10) Patent No.: US 12,482,156 B2
(45) Date of Patent: Nov. 25, 2025

(54) CONTROLLABLE MAKEUP TRANSFER VIA SCRIBBLE INPUTS

(71) Applicant: ADOBE INC., San Jose, CA (US)

(72) Inventors: Abhishek Lalwani, Amherst, MA (US);
Xiaoyang Li, San Francisco, CA (US);
Yijun Li, Seattle, WA (US)

(73) Assignee: ADOBE INC., San Jose, CA (US)

( * ) Notice: Subject to any disclaimer, the term of this patent is extended or adjusted under 35 U.S.C. 154(b) by 373 days.

(21) Appl. No.: 18/149,967

(22) Filed: Jan. 4, 2023

(65) Prior Publication Data
US 2024/0221252 A1    Jul. 4, 2024

(51) Int. Cl.
| | | |
|---|---|---|
| G06T 11/60 | (2006.01) | |
| G06T 3/40 | (2024.01) | |
| G06T 5/50 | (2006.01) | |
| G06T 11/00 | (2006.01) | |

(52) U.S. Cl.
CPC .............. G06T 11/60 (2013.01); G06T 3/40 (2013.01); G06T 5/50 (2013.01); G06T 11/001 (2013.01); *G06T 2200/24* (2013.01); *G06T 2207/20081* (2013.01); *G06T 2207/20084* (2013.01); *G06T 2207/20221* (2013.01); *G06T 2207/20224* (2013.01); *G06T 2207/30201* (2013.01)

(58) Field of Classification Search
CPC ......... G06T 11/60; G06T 11/001; G06T 3/40; G06T 5/50; G06T 2200/24; G06T 2207/20081; G06T 2207/20084; G06T 2207/20221; G06T 2207/20024; G06T 2207/30201; G06T 2207/20224
See application file for complete search history.

(56) References Cited

U.S. PATENT DOCUMENTS

| | | | | |
|---|---|---|---|---|
| 2011/0115786 A1* | 5/2011 | Mochizuki | ............ | G06T 11/001 |
| | | | | 345/419 |
| 2017/0076474 A1* | 3/2017 | Fu | ............................ | G06T 11/00 |
| 2018/0025218 A1* | 1/2018 | Steinberg | ............. | G06V 40/167 |
| | | | | 715/822 |
| 2022/0028139 A1* | 1/2022 | Mitra | ................... | G06V 40/175 |
| 2022/0138914 A1* | 5/2022 | Wang | ..................... | G06V 10/52 |

OTHER PUBLICATIONS

Kips, et al., "CA-GAN: Weakly Supervised Color Aware GAN for Controllable Makeup Transfer", European Conference on Computer Vision, Springer, Cham, arXiv preprint arXiv:2008.10298v1 [cs.CV] Aug. 24, 2020, 16 pages.
Deng, et al., "Spatially-invariant Style-codes Controlled Makeup Transfer", In Proceedings of the IEEE/CVF Conference on Computer Vision and Pattern Recognition, pp. 6549-6557, 2021.

(Continued)

*Primary Examiner* — Michelle Chin
(74) *Attorney, Agent, or Firm* — F. CHAU & ASSOCIATES, LLC

(57) ABSTRACT

Systems and methods for image processing are described. Embodiments of the present disclosure identify an original image depicting a face, identify a scribble image including a mask that indicates a portion of the original image for adding makeup to the face, and generate a target image depicting the face using a machine learning model based on the original image and the scribble image, where the target image includes the makeup in the portion indicated by the scribble image.

20 Claims, 9 Drawing Sheets

(56) References Cited

OTHER PUBLICATIONS

Karras, et al., "A Style-Based Generator Architecture for Generative Adversarial Networks", In Proceedings of the IEEE/CVF conference on computer vision and pattern recognition, pp. 4401-4410, 2019.

Isola, et al., "Image-to-Image Translation with Conditional Adversarial Networks", In Proceedings of the IEEE conference on computer vision and pattern recognition, pp. 1125-1134, 2017.

* cited by examiner

CONTROLLABLE MAKEUP TRANSFER VIA SCRIBBLE INPUTS

BACKGROUND

The following relates generally to digital image processing, and more specifically to image editing using machine learning.

Digital image processing refers to the use of a computer to process a digital image using an algorithm or a processing network. Some common tasks of digital image processing involve image enhancement, restoration, completion, compression, etc. In some cases, a digital image is modified using image editing software (e.g., Photoshop®). For example, the image editing software is used to add target makeup to an original facial image without makeup to obtain a modified image having desired makeup.

Machine learning models, such as generative adversarial networks (GANs) and variations of GANs, are used in image editing. However, conventional models are limited in providing users with control with respect to the generated images. For example, given a fixed set of input images without makeup, a reference makeup can prevent a user from modifying the generated image in a fine-grained manner. Therefore, there is a need in the art for an improved image editing system that makes a makeup transfer process controllable by providing control of the generated image (e.g., a pixel-level control).

SUMMARY

The present disclosure describes systems and methods for image editing. Embodiments of the present disclosure include an image editing apparatus configured to generate an output image using a machine learning model that takes an original image and a scribble image as input. The machine learning model generates a target image depicting a face in the original image, and the target image includes the makeup in the portion indicated by the scribble image. In some examples, a scribble component of the image editing apparatus generates a scribble image including a mask that indicates a portion of an original image for adding makeup. In some examples, the machine learning model concatenates the original image and the scribble image as different channels of an encoder input, encodes the encoder input to obtain a feature representation, and decodes the feature representation to obtain the target image.

A method, apparatus, and non-transitory computer-readable medium for image editing are described. One or more aspects of the method, apparatus, and non-transitory computer-readable medium include identifying an original image depicting a face; identifying a scribble image comprising a mask that indicates a portion of the original image for adding makeup to the face; and generating a target image depicting the face using a machine learning model based on the original image and the scribble image, where the target image includes the makeup in the portion indicated by the scribble image.

A method, apparatus, and non-transitory computer-readable medium for image editing are described. One or more aspects of the method, apparatus, and non-transitory computer-readable medium include identifying an original image depicting a face and a makeup image depicting the face with makeup; generating a scribble image based on the makeup image, where the scribble image comprises a mask that indicates a portion of the original image for adding makeup to the face; generating a target image depicting the face using a machine learning model based on the original image and the scribble image, where the target image includes the makeup in the portion indicated by the scribble image; comparing the target image and the makeup image; and updating parameters of the machine learning model based on the comparison.

An apparatus and method for image editing are described. One or more aspects of the apparatus and method include a processor; a memory including instructions executable by the processor; a scribble component configured to generate a scribble image comprising a mask that indicates a portion of an original image for adding makeup; and an image generation network configured to generate a target image depicting a face in the original image, where the target image includes the makeup in the portion indicated by the scribble image.

DETAILED DESCRIPTION

Figure 1:
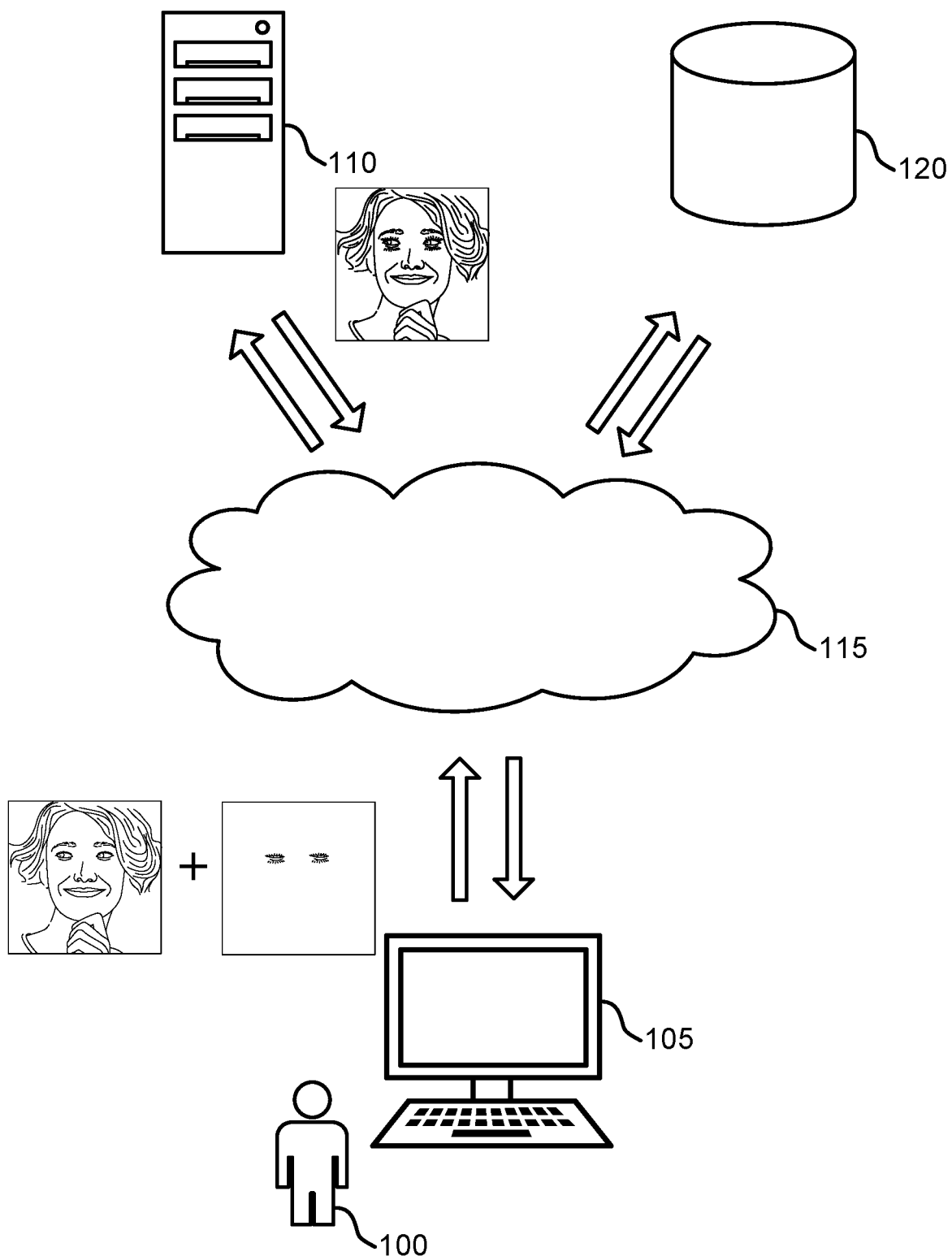
FIG. 1 shows an example of an image editing system according to aspects of the present disclosure.

Embodiments of the present disclosure include an image editing apparatus configured to generate an output image using a machine learning model that takes an original image and a scribble image as input. The machine learning model generates a target image depicting a face in the original image, and the target image includes the makeup in the portion indicated by the scribble image. In some examples, a scribble component of the image editing apparatus generates a scribble image including a mask that indicates a portion of an original image for adding makeup. In some examples, the machine learning model concatenates the original image and the scribble image as different channels of an encoder input, encodes the encoder input to obtain a feature representation, and decodes the feature representation to obtain the target image.

In some cases, GANs and variants of GANs are used to transfer makeup from a reference image (e.g., an image depicting a face with the makeup) to an original image (e.g., an image depicting a different face without makeup). However, this approach is limited in providing control over the generated image and in processing challenging makeup styles (e.g., makeup with multiple colors or complex patterns). For example, CA-GAN allows users to modify the global color of specific objects (e.g., lips or eyes) in an image to an arbitrary target color while preserving the image's background, but CA-GAN does not work well in the cases where multiple colors are involved in a single makeup. StyleGAN allows control of style in the generated images by using an intermediate latent space, but the intermediate latent space cannot be modified given different inputs.

In some cases, computer vision methods (e.g., perspective transformation of the delta layers of the makeup in the reference image to fit them on top of the original images without makeup using facial key-points) are used to perform makeup transfer. However, this approach is limited in processing challenging inputs with challenging faces, and it results in artifacts in the generated image. In some cases, a Pix2Pix model is used to perform makeup transfer. A Pix2Pix model is a GAN where the generator model for the GAN is implemented as a U-Net. The U-Net is an encoder-decoder model for image translation. However, this approach is designed to perform image-to-image translation directly from one domain to another, and it does not provide means of control given a fixed original image. Further, the Pix2Pix model fails to learn challenging reference makeup pattens (e.g., cat eyes).

Embodiments of the present disclosure provide systems and methods for image editing, particularly makeup transfer, by using a scribble image as input. The scribble image is used to specify type and location of a color in the generated image. A scribble image includes a mask that indicates a portion of the original image for adding makeup to the face. For example, the scribble image includes black pixels and non-black pixels. The non-black pixels include color information of the makeup and location information corresponding to the original image. The non-black pixels are used to specify the user's preference for color in the corresponding locations of the target image. The black pixels are used to specify which portion of the input original image without makeup is propagated directly to the target image. In some cases, the non-black pixels of the scribble image include multiple colors.

Embodiments of the present disclosure provide systems and methods for image editing, particularly makeup transfer, by using a modified U-Net which takes concatenated original image and scribble image as input and generates a target image depicting the face based on the original image and the scribble image. For example, embodiments of the present disclosure provide systems and methods for encoding the original image along three channels to obtain a three-channel representation of the original image and encoding the scribble image along three channels to obtain a three-channel representation of the scribble image. Embodiments of the present disclosure providing systems and methods for concatenating the three-channel representation of the original image and the three-channel representation of the scribble image to obtain a six-channel representation of the input, which is supplied to a U-Net. The U-Net progressively encodes the six-channel representation of the input to obtain a feature representation and decodes the feature representation to obtain the target image.

In the present disclosure, the term "scribble image" refers to an image including non-black pixels and black pixels. The non-black pixels and the black pixels form a mask that indicates a portion of an original image for adding makeup to the face depicted in the original image. The non-black pixels include color information of the makeup and location information corresponding to the original image, which are used to specify the user's preference for color in the corresponding locations of the target image. The black pixels are used to specify which portion of the original image without makeup is propagated directly to the target image. For example, a scribble image includes yellow-colored pixels and black pixels. The yellow-colored pixels are in locations corresponding to an eye region of the original image. In this example, the yellow-colored pixels indicate that the user wants to add the yellow-colored makeup at the corresponding eye region of the original image. Examples of the makeup include eyelash, eyeshadow, and eyebrow, etc. An eye region may be pixels surrounding the eyes where makeup such as eyelash, eyeshadow, and eyebrow may cover. In some cases, the image generation system generates a target image with the yellow-colored makeup added to the corresponding eye region of the original image while maintaining the other portion of the original image substantially unchanged. In some cases, the scribble image is provided by the user through manual input via a drawing interface. In some cases, the scribble image is synthesized by the system. According to embodiments, the scribble image is of the same size (e.g., 2×2 inches) as the original image and the target image. According to some embodiments, the scribble image allows the user to exercise pixel-level control over the target image by controlling the colors of the corresponding pixels in the scribble image. The user can also exercise the pixel-level control in different ways given different original images using the same machine learning model trained according to embodiments of the present disclosure.

The term "original image" refers to a no-makeup image depicting a face without makeup. The original image is used as input for the image editing system according to embodiments of the present disclosure. For example, the user can provide an original image via an interface.

The term "target image" refers to an image depicting the face in the original image with makeup transferred. The target image is an output image generated by the system according to embodiments of the present disclosure. For example, as the original image depicts a face without makeup and the scribble image indicates a yellow-colored makeup in an eye region, the target image depicts the yellow-colored makeup added to the corresponding eye region of the original image while maintains the rest of the original image (the portion not in the corresponding eye region) substantially unchanged.

Network Architecture

Figure 2:
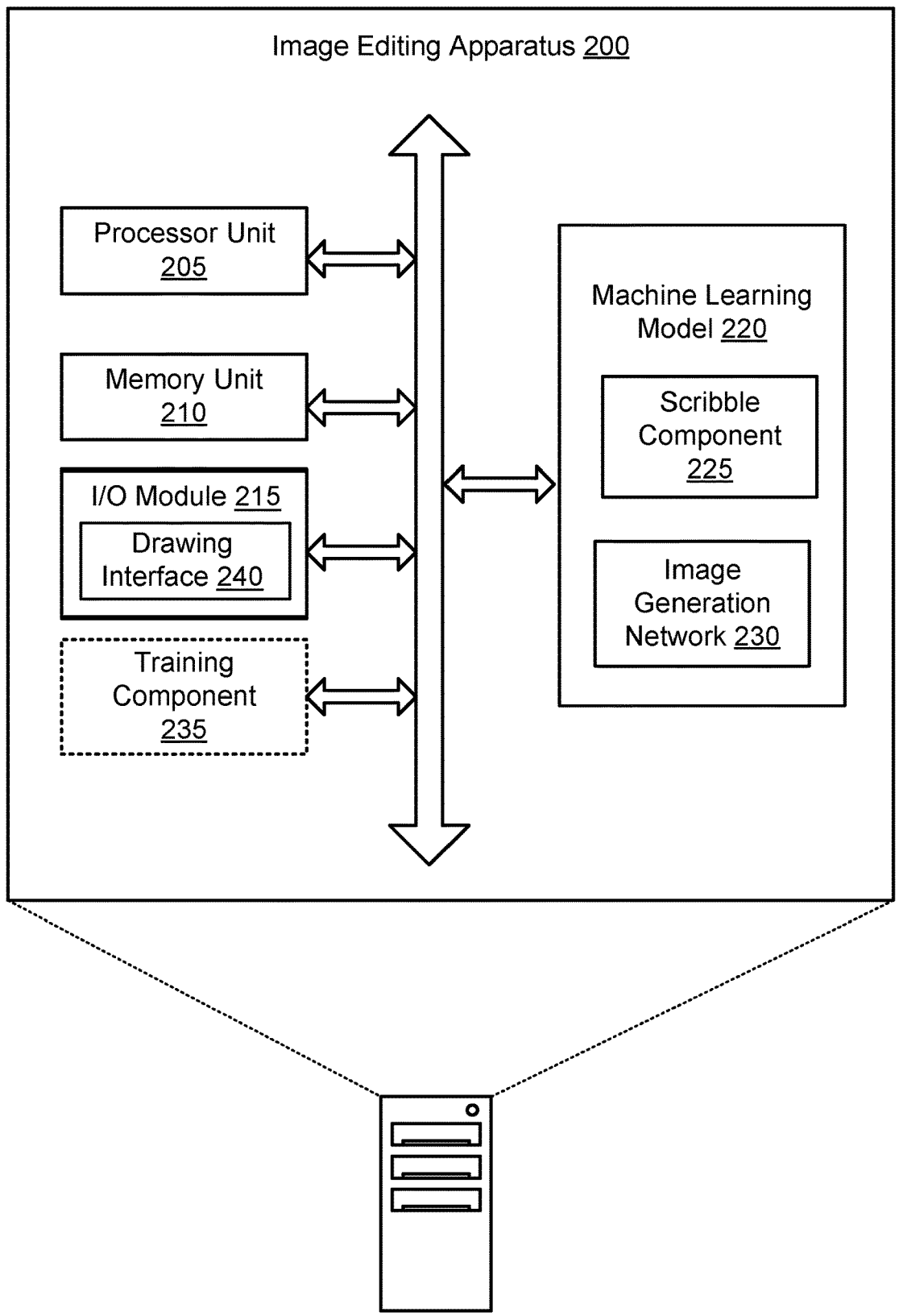
FIG. 2 shows an example of an image editing apparatus according to aspects of the present disclosure.
Figure 3:
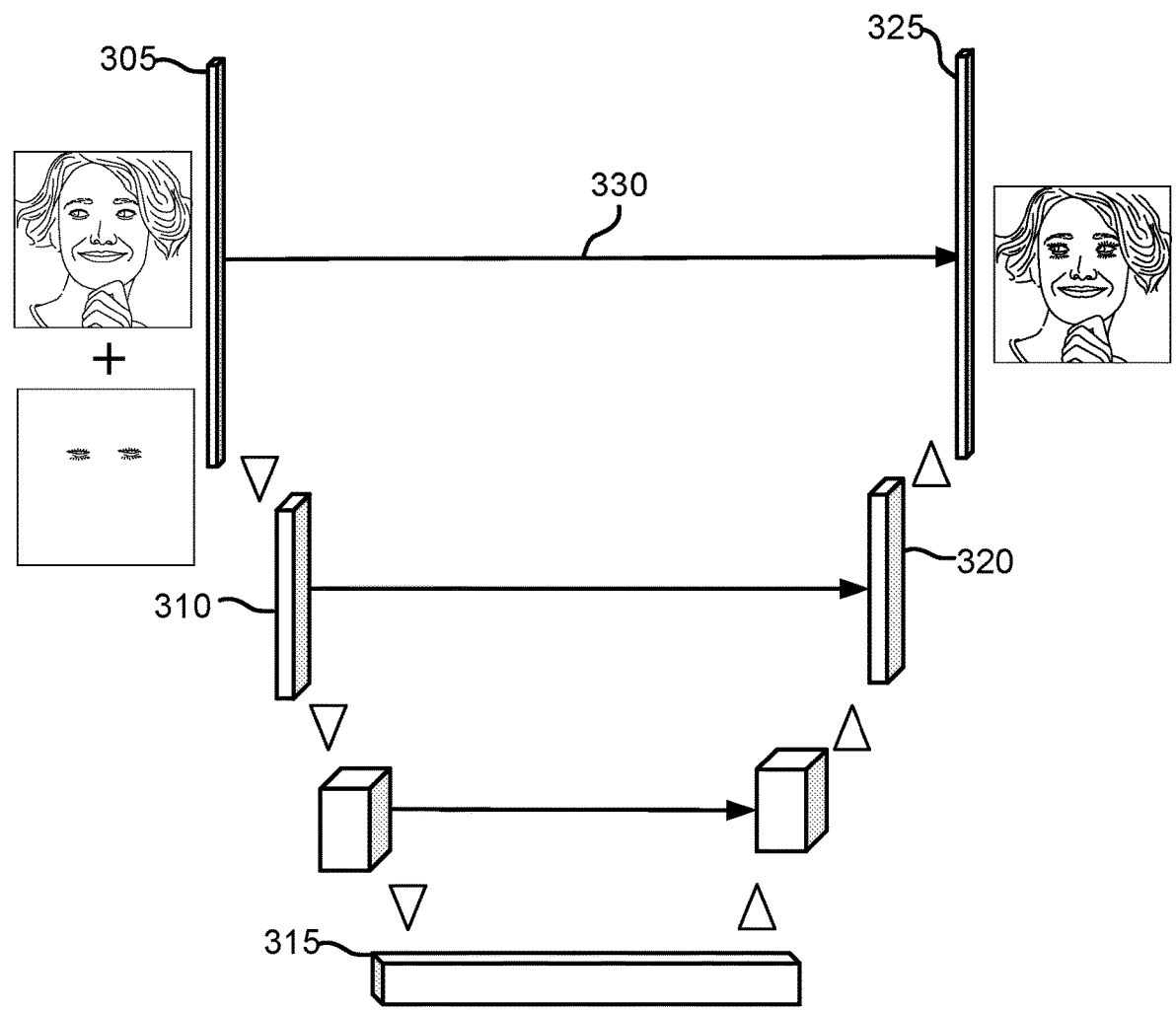
FIG. 3 shows an example of an image generation network according to aspects of the present disclosure.

In FIGS. 1-3, an apparatus and method for image editing are described. One or more aspects of the apparatus and method include a processor; a memory including instructions executable by the processor; a scribble component configured to generate a scribble image comprising a mask that indicates a portion of an original image for adding makeup; and an image generation network configured to generate a target image depicting a face in the original image, where the target image includes the makeup in the portion indicated by the scribble image.

In some embodiments, the machine learning model comprises a U-Net architecture. In some embodiments, the machine learning model comprises a first input channel corresponding to the original image and a second input channel corresponding to the scribble image.

Some examples of the apparatus and method further include a drawing interface configured to receive a scribble input from a user, where the scribble image is based on the scribble input. Some examples of the apparatus and method further include a training component configured to update parameters of the machine learning model. In some embodiments, the scribble component generates the scribble image based on the original image.

FIG. 1 shows an example of an image editing system according to aspects of the present disclosure. The example shown includes user 100, user device 105, image editing apparatus 110, cloud 115, and database 120. Image editing apparatus 110 is an example of, or includes aspects of, the corresponding element described with reference to FIG. 2.

As the example shown in FIG. 1, user 100 provides an original image and a scribble image. The original image and the scribble image are transmitted to image editing apparatus 110, e.g., via user device 105 and cloud 115. Image editing apparatus 110 identifies the scribble image as including a mask (e.g., non-black pixels and black pixels) that indicates a portion (e.g., an eye region surrounding the eyes where makeup such as eyelash, eyeshadow, and eyebrow may cover) of the original image for adding makeup (e.g., eyelash, eyeshadow, and eyebrow) to the face. Image editing apparatus 110 generates a target image depicting the face based on the original image and the scribble image. The target image includes the makeup in the portion indicated by the scribble image. The scribble image is of the same size (e.g., 2×2 inches) as the original image and the target image. The target image is generated and transmitted to user 100, e.g., via cloud 115 and user device 105.

User device 105 is a personal computer, laptop computer, mainframe computer, palmtop computer, personal assistant, mobile device, or any other suitable processing apparatus. In some examples, user device 105 includes software that incorporates an image editing application. In some examples, the image processing application on user device 105 includes functions of image editing apparatus 110.

A user interface enables user 100 to interact with user device 105. In some embodiments, the user interface includes an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image editing apparatus 110 includes a computer implemented network comprising a scribble component and an image generation network. Image editing apparatus 110 also includes a processor unit, a memory unit, an I/O module, a drawing interface, and a training component. The training component is used to train a machine learning model (e.g., an image generation network or a classifier). Additionally, image editing apparatus 110 can communicate with database 120 via cloud 115. In some cases, the architecture of the image editing network is also referred to as a network or a network model. Further detail regarding the architecture of image editing apparatus 110 is provided with reference to FIGS. 1-3. Further detail regarding the operation of image editing apparatus 110 is provided with reference to FIGS. 4-7. Further detail regarding the training of image editing apparatus 110 is provided with reference to FIGS. 8-9.

In some cases, image editing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses on one or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus. In some examples, image editing apparatus 110 can be implemented on electronic devices (e.g., low-storage electronic devices) and cloud-related devices.

Cloud 115 is a computer network configured to provide on-demand availability of computer system resources, such as data storage and computing power. In some examples, cloud 115 provides resources without active management by user 100. The term cloud is sometimes used to describe data centers available to many users over the Internet. Some large cloud networks have functions distributed over multiple locations from central servers. A server is designated an edge server if the server has a direct or close connection to a user (e.g., user 100). In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with the database controller. In other cases, the database controller may operate automatically without user interaction.

FIG. 2 shows an example of an image editing apparatus 200 according to aspects of the present disclosure. The example shown includes processor unit 205, memory unit 210, I/O module 215, training component 235, drawing interface 240, and machine learning model 220. In some embodiments, machine learning model 220 includes scribble component 225 and image generation network 230. According to some embodiments, machine learning model 220 includes a memory including instructions executable by the processor. Image editing apparatus 200 is an example of, or includes aspects of, the corresponding element described with reference to FIG. 1.

Processor unit 205 comprises a processor. Processor unit 205 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in memory to perform various functions. In some embodiments, processor unit 205 includes special-purpose components for modem processing, baseband processing, digital signal processing, or transmission processing.

Memory unit 210 comprises memory including instructions executable by processor unit 205. Examples of memory unit 210 include random access memory (RAM), read-only memory (ROM), or a hard disk. Examples of memory unit 210 include solid-state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) includes an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a communication interface operates at the boundary between communicating entities and the channel and may also record and process communications. A communication interface is provided herein to enable a processing system coupled to a transceiver (e.g., a transmitter and/or a receiver). In some examples, the transceiver is configured to transmit (or send) and receive signals for a communications device via an antenna. In some embodiments, the user interface includes drawing interface 240. Drawing interface 240 receives a scribble input from a user, and the scribble image is based on the scribble input.

According to some embodiments of the present disclosure, image editing apparatus 200 includes a computer-implemented artificial neural network (ANN) to generate classification data for a set of samples. An ANN is a hardware or software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image editing apparatus 200 includes a computer-implemented convolutional neural network (CNN). CNN is a class of neural networks that are commonly used in computer vision or image classification systems. In some cases, a CNN may enable the processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, machine learning model 220 identifies an original image depicting a face and a makeup image depicting the face with makeup. In some examples, machine learning model 220 generates a difference image that depicts the makeup based on a difference between the original image and the makeup image. In some examples, machine learning model 220 identifies a face image. In some examples, machine learning model 220 extracts an eye region of the face image to obtain the original image. In some examples, machine learning model 220 generates the makeup image based on the original image using a synthetic makeup transfer model.

According to some embodiments, scribble component 225 identifies a scribble image including a mask that indicates a portion of the original image for adding makeup to the face. In some examples, scribble component 225 expands the scribble input to obtain the scribble image. In some examples, scribble component 225 receives a color input from the user, where the scribble image is based on the color input. In some embodiments, the makeup in the target image extends to pixels outside of the mask of the scribble image. In some embodiments, each pixel of the scribble image includes color information of the makeup and location information corresponding to the original image. In some examples, scribble component 225 identifies an additional scribble image including an additional mask that indicates an additional portion of the original image for adding additional makeup to the face.

According to some embodiments, scribble component 225 generates a scribble image based on the makeup image, where the scribble image includes a mask that indicates a portion of the original image for adding makeup to the face. In some examples, scribble component 225 removes pixels from the difference image to obtain the scribble image.

According to some embodiments, image generation network 230 generates a target image depicting the face based on the original image and the scribble image, where the target image includes the makeup in the portion indicated by the scribble image. In some examples, image generation network 230 concatenates the original image and the scribble image as different channels of an encoder input. In some examples, image generation network 230 encodes the encoder input to obtain a feature representation. In some examples, image generation network 230 decodes the feature representation to obtain the target image. In some embodiments, the makeup includes eyeshadow makeup and additional makeup includes eyelash makeup. In some examples, image generation network 230 generates an additional target image depicting the face based on the target image and the additional scribble image, where the additional target image includes the makeup and the additional makeup.

In some embodiments, the image generation network 230 includes a U-Net architecture. In some embodiments, the image generation network 230 includes a first input channel corresponding to the original image and a second input channel corresponding to the scribble image.

According to some embodiments, training component 235 compares the target image and the makeup image. In some examples, training component 235 updates parameters of image generation network 230 based on the comparison. In some examples, training component 235 blends the original image and the makeup image with a gradient mask to obtain a blended makeup image, where the parameters of image generation network 230 are updated based on the blended makeup image. A gradient mask is a filter that performs gradient-level adjustments to images. Blending the original image with the makeup image with a gradient allows transferring the makeup to the original image along the gradient, generating a smooth effect.

In some examples, training component 235 may be implemented on a different apparatus other than image editing apparatus 200.

The described methods are implemented or performed by devices that include a general-purpose processor, a digital signal processor (DSP), an application-specific integrated circuit (ASIC), a field programmable gate array (FPGA), or other programmable logic devices, discrete gate or transistor logic, discrete hardware components, or any combination thereof. A general-purpose processor may be a microprocessor, a conventional processor, a controller, a microcontroller, or a state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components include properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 3 shows an example of an image generation network according to aspects of the present disclosure. The example shown includes U-Net 300, encoder input 305, intermediate features 310, lowest-level features 315, up-sampled features 320, and decoder output 325. According to some embodiments, U-Net 300 generates a target image depicting the face using a machine learning model based on the original image and the scribble image, where the target image includes the makeup in the portion indicated by the scribble image.

According to some embodiments, U-Net 300 takes an original image and a scribble image as input. In some cases, U-Net 300 concatenates the original image and the scribble image as different channels of an encoder input to obtain encoder input 305. In some cases, the operations of this step refer to, or may be performed by, an image generation network as described with reference to FIG. 2.

According to some embodiments, encoder input 305 has an initial resolution and an initial number of channels. The system processes encoder input 305 using an initial neural network layer (e.g., a convolutional network layer) to produce intermediate features 310. The system down-samples intermediate features 310 using down-sampling layers. This process is repeated multiple times to obtain the lowest-level features 315.

This process is then reversed. That is, the down-sampled features are up-sampled using an up-sampling process to obtain up-sampled features 320. In some examples, the up-sampled features 320 can be combined with intermediate features having the same resolution and number of channels via a skip connection 330. These inputs are processed using a final neural network layer to produce decoder output 325 as the generated target image. In some cases, the target image has the same resolution as the initial resolution and the same number of channels as the initial number of channels.

Image Processing

According to embodiments described in FIGS. 4 through 7, various methods for image generation (i.e., image editing) are described. One or more aspects of the method include identifying an original image depicting a face and a makeup image depicting the face with makeup; generating a scribble image based on the makeup image, wherein the scribble image comprises a mask that indicates a portion of the original image for adding makeup to the face; generating a target image depicting the face using a machine learning model based on the original image and the scribble image, wherein the target image includes the makeup in the portion indicated by the scribble image; comparing the target image and the makeup image; and updating parameters of the image generation network based on the comparison.

Some examples of the method, apparatus, and non-transitory computer-readable medium further include providing a drawing interface to a user. Some examples further include receiving a scribble input from the user via the drawing interface, where the scribble image is based on the scribble input.

Some examples of the method, apparatus, and non-transitory computer-readable medium further include resizing the scribble input based on a size of the original image to obtain the scribble image.

Some examples of the method, apparatus, and non-transitory computer-readable medium further include receiving a color input from the user, where the scribble image is based on the color input.

In some embodiments, the makeup in the target image extends to pixels outside of the mask of the scribble image.

Some examples of the method, apparatus, and non-transitory computer-readable medium further include concatenating the original image and the scribble image as different channels of an encoder input. Some examples further include encoding the encoder input to obtain a feature representation. Some examples further include decoding the feature representation to obtain the target image.

In some embodiments, the makeup comprises eyeshadow makeup and additional makeup comprises eyelash makeup. In some embodiments, each pixel of the scribble image comprises color information of the makeup and location information corresponding to the original image.

Some examples of the method, apparatus, and non-transitory computer-readable medium further include identifying an additional scribble image comprising an additional mask that indicates an additional portion of the original image for adding additional makeup to the face. Some examples further include generating an additional target image depicting the face using the image generation network based on the target image and the additional scribble image, where the additional target image includes the makeup and the additional makeup.

Figure 4:
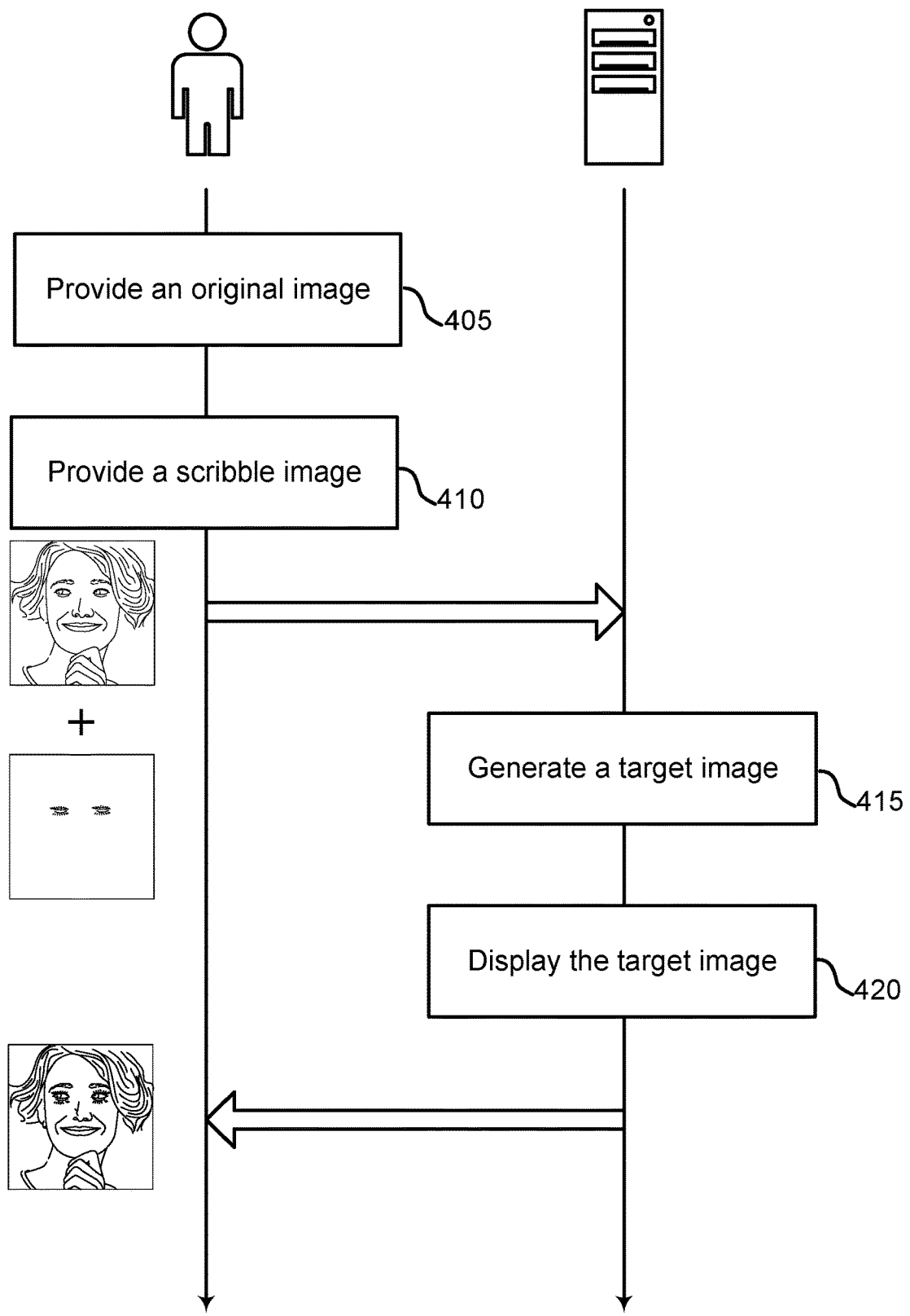
FIG. 4 shows an example of image generation according to aspects of the present disclosure.

FIG. 4 shows an example image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps or are performed in conjunction with other operations.

At operation 405, the user provides an original image. In some cases, the operations of this step refer to, or may be performed by, a user as described with reference to FIG. 1. In some cases, for example, the original image is an image depicting a face of a person without makeup.

At operation 410, the user provides a scribble image. In some cases, the operations of this step refer to, or may be performed by, an image editing apparatus as described with reference to FIGS. 1 and 2. In some cases, for example, the user can specify the desired color in the target image by providing the scribble image. In some examples, the user specifies the desired colors in a group of pixels by performing a pixel-level control of the scribble images. In some examples, the desired colors specified by the user is of the same format as the colors in the target image and is propagated to the target image using a machine learning model as described with reference to FIGS. 2-3.

According to some embodiments, the scribble image is an image of the same size as the original image. In some examples, the scribble image includes black pixels and non-black pixels. The non-black pixels include color information of the makeup and location information corresponding to the original image, which are used to specify the user's preference for color and location in the generated image. For example, yellow-colored pixels in the scribble image are used to specify that the user wants yellow color at the corresponding pixel-level locations in the target image. The black pixels are used to specify which portion of the input original image without makeup is propagated directly to the target image.

According to some embodiments, the user provides the scribble image with pixel-level color information of the makeup and location information corresponding to the original image. In some cases, the user provides the scribble image by modifying a group of pixels indicating the color information of the makeup and the location information corresponding to the original image, where the group of pixels are extracted from an existing makeup image. For example, the user can specify the color at a location in the generated target image by inputting the color at the corresponding pixel-level location in the scribble image.

At operation 415, the system generates a target image based on the original image and the scribble image. In some cases, the operations of this step refer to, or may be performed by, an image editing apparatus as described with reference to FIGS. 1 and 2. In some cases, for example, the image editing apparatus generates a target image depicting the face based on the original image and the scribble image. The target image includes the makeup in the portion indicated by the scribble image.

At operation 420, the system displays the target image to the user. In some cases, the operations of this step refer to, or may be performed by, an image editing apparatus as described with reference to FIGS. 1 and 2. In some examples, the target image is an anonymized image where the face of the target image may look different from the original face due to the added desired makeup.

Figure 5:
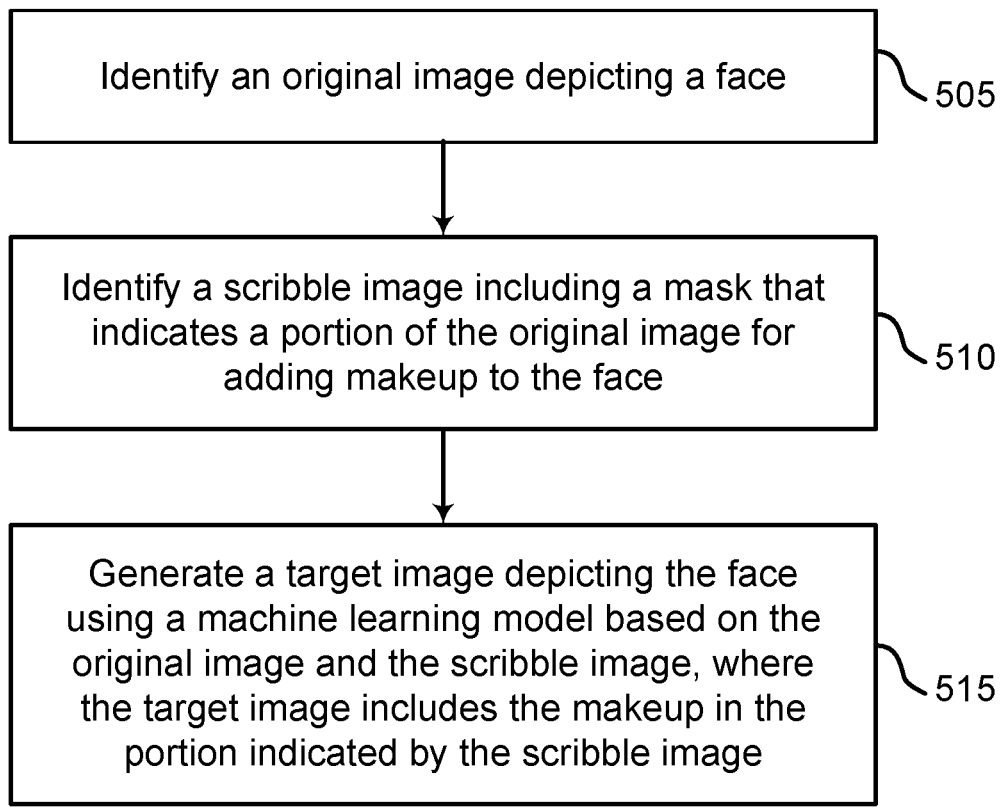
FIG. 5 shows an example of a method for image generation according to aspects of the present disclosure.

FIG. 5 shows an example of a method for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps or are performed in conjunction with other operations.

At operation 505, the image generation system identifies an original image depicting a face. In some cases, the operations of this step refer to, or may be performed by, a machine learning model as described with reference to FIG. 2.

At operation 510, the image generation system identifies a scribble image including a mask that indicates a portion of the original image for adding makeup to the face. In some cases, the scribble image includes black pixels and non-black pixels. The non-black pixels include color information of the makeup and location information corresponding to the original image, which are used to specify the user's preference for color in the corresponding locations of the target image. The black pixels are used to specify which portion of the input original image without makeup is propagated directly to the target image. The non-black pixels and the black pixels form a mask. For example, a scribble image includes yellow-colored pixels and black pixels. The yellow-colored pixels are in locations corresponding to an eye region of the original image. In this example, the yellow-colored pixels indicate the user wants to add the yellow-colored makeup at the corresponding eye region of the original image. Examples of the makeup include eyelash, eyeshadow, and eyebrow, etc. An eye region may be pixels surrounding the eyes where makeup such as eyelash, eyeshadow, and eyebrow may cover. In some cases, the image generation system generates a target image with the yellow-colored makeup added to the corresponding eye region of the original image while maintain the other portion of the original image substantially unchanged.

In some cases, the operations of this step refer to, or may be performed by, a scribble component as described with reference to FIG. 2.

At operation 515, the image generation system generates a target image depicting the face using a machine learning model based on the original image and the scribble image, where the target image includes the makeup in the portion indicated by the scribble image. In some cases, the portion indicated by the scribble image is corresponding to the non-black pixels in the scribble image, and the target image includes the other portion which is corresponding to the black pixels in the scribble image. In some cases, the target image maintains the other portion of the original image substantially unchanged.

In some cases, the operations of this step refer to, or may be performed by, a machine learning model as described with reference to FIG. 2.

According to some embodiments, a machine learning model in the image generation system takes the original image and the scribble image as input. In some examples, a machine learning model in the system concatenates the original image and the scribble image as different channels of an encoder input. The machine learning model encodes the encoder input to obtain a feature representation. The machine learning model decodes the feature representation to obtain the target image.

According to some embodiments, the machine learning model concatenates the input original image and the scribble image along multiple channels (e.g., along three channels) and supplies the resultant image (e.g., a six-channel image, where three channels are corresponding to the original image and the other three channels are corresponding to the scribble image) as input to the U-Net while keeping the target image with the transferred makeup as the output.

According to some embodiments, the machine learning model has a U-Net architecture. The machine learning model first progressively down-samples the input image data to the lowest layer of features. After that, the machine learning model up-samples the input image data to the output image. In some cases, the system can skip connections in the U-Net to directly shuttle relevant information between the input image and the output image.

In some examples, the machine learning model includes a modified U-Net model which predicts a three-channel image from two three-channel images, where the two three-channel images are encoded along six channels in the U-Net model. Embodiments of the present disclosure are not limited to a particular number of channels and the number of channels may vary depending upon the domain of the input and the output image.

Figure 6:
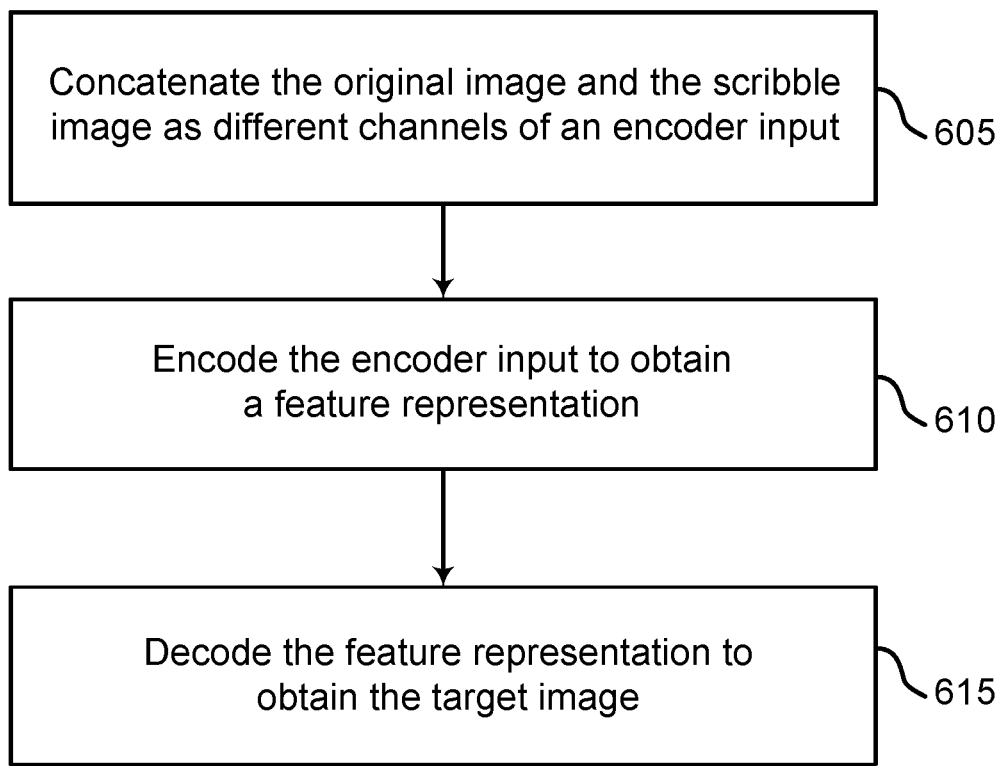
FIG. 6 shows an example of a method for generating a target image according to aspects of the present disclosure.

FIG. 6 shows an example of a method for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system concatenates the original image and the scribble image as different channels of an encoder input. For example, the system encodes the original image along three channels to obtain a three-channel representation of the original image and encodes the scribble image along three channels to obtain a three-channel representation of the scribble image. After that, the system concatenates the three-channel representation of the original image and the three-channel representation of the scribble image to obtain a six-channel representation of the input. In this example, the six-channel representation of the input is used as an encoder input of the machine learning model. In some cases, the operations of this step refer to, or may be performed by, a machine learning model as described with reference to FIG. 2.

At operation 610, the system encodes the encoder input to obtain a feature representation. In some cases, the operations of this step refer to, or may be performed by, a machine learning model as described with reference to FIG. 2. In some cases, the system progressively down-samples the input image data to the lowest layer of feature representation.

At operation 615, the system decodes the feature representation to obtain the target image. In some cases, the operations of this step refer to, or may be performed by, a machine learning model as described with reference to FIG. 2. In some cases, the system up-samples the lowest layer of feature representation to obtain the output image. In some cases, the system can skip connections in the U-Net to directly shuttle relevant information between the input and the output image.

Figure 7:
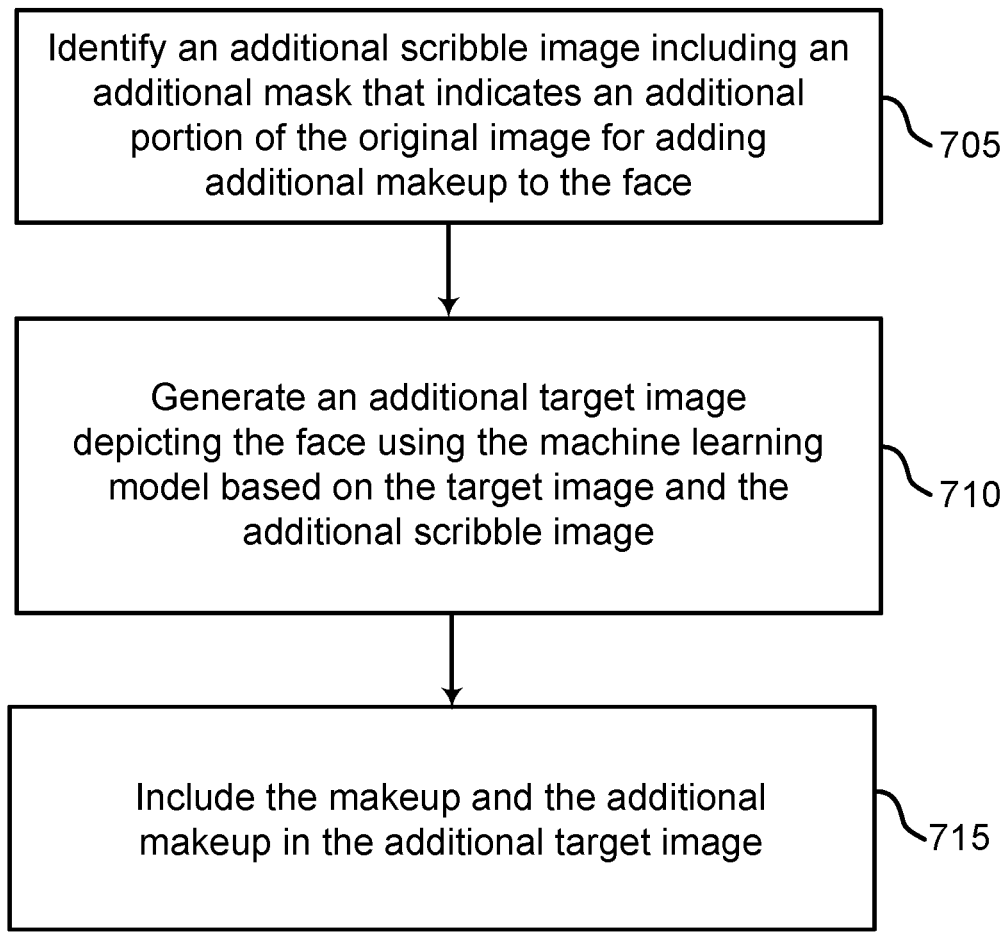
FIG. 7 shows an example of a method for generating an additional target image according to aspects of the present disclosure.

FIG. 7 shows an example of a method for generating an additional target image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. In some cases, an additional target image is generated to transfer a mixed makeup. For example, mixed makeup includes eyeshadow makeup and additional eyelash makeup.

According to some embodiments, image editing apparatus 200 as shown in FIG. 2 performs sequential inference to transfer multiple makeups sequentially to the original image. In some cases, different machine learning models can be trained separately to transfer corresponding makeup.

At operation 705, the system identifies an additional scribble image including an additional mask that indicates an additional portion of the original image for adding additional makeup to the face. In some cases, the operations of this step refer to, or may be performed by, a scribble component as described with reference to FIG. 2. For example, the machine learning model generates a target image depicting the eyeshadow makeup based on the scribble image including the mask that indicates the eyeshadow makeup. In this example, the output of operation 705 is a target image having the eyeshadow makeup.

At operation 710, the system generates an additional target image depicting the face using the machine learning model based on the target image and the additional scribble image. For example, the machine learning model uses both the generated target image at operation 705 and the additional mask that indicates the eyelash as input. In this example, the output of operation 710 is an additional target image having the eyeshadow and the eyelash.

At operation 715, the system includes the makeup and the additional makeup in the target image. In some cases, the operations of this step refer to, or may be performed by, a machine learning model as described with reference to FIG. 2.

Training and Evaluation

Figure 8:
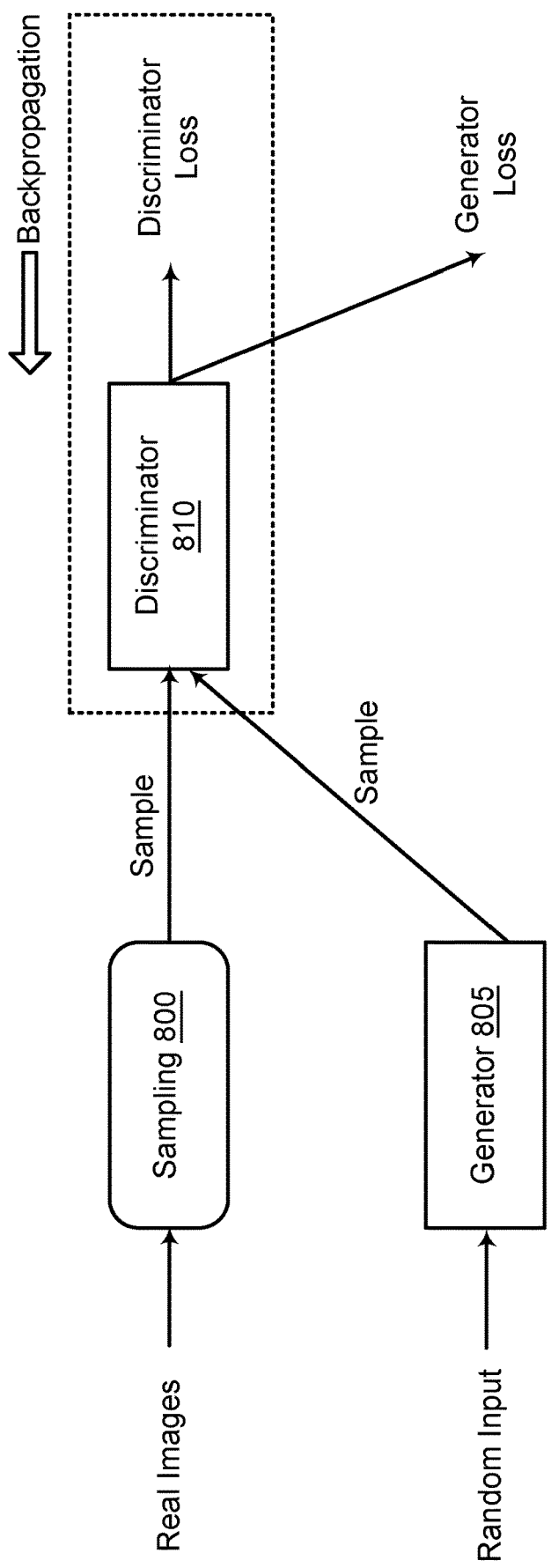
FIG. 8 shows an example of a generative adversarial network (GAN) training according to aspects of the present disclosure.
Figure 9:
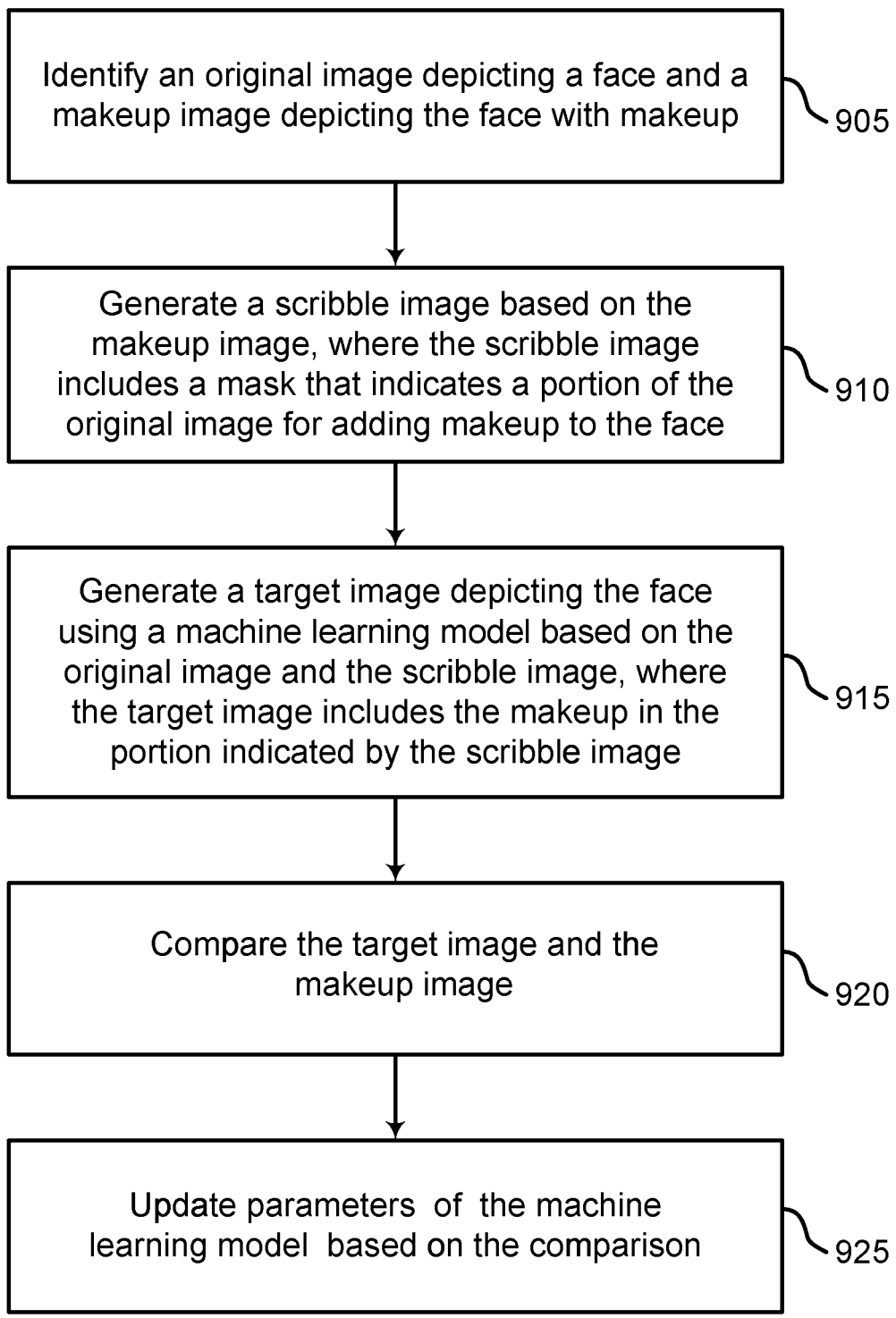
FIG. 9 shows an example of a method for training a machine learning model according to aspects of the present disclosure.

In FIGS. 8 and 9, a method for image editing is described. One or more aspects of the method include identifying an original image depicting a face and a makeup image depicting the face with makeup; generating a scribble image based on the makeup image, where the scribble image comprises a mask that indicates a portion of the original image for adding makeup to the face; generating a target image depicting the face using a machine learning model based on the original image and the scribble image, where the target image includes the makeup in the portion indicated by the scribble image; comparing the target image and the makeup image; and updating parameters of the machine learning model based on the comparison.

Some examples of the method, apparatus, and non-transitory computer-readable medium further include generating a difference image that depicts the makeup based on a difference between the original image and the makeup image. Some examples further include removing pixels from the difference image to obtain the scribble image.

Some examples of the method, apparatus, and non-transitory computer-readable medium further include identifying a face image. Some examples further include extracting an eye region of the face image to obtain the original image.

Some examples of the method, apparatus, and non-transitory computer-readable medium further include generating the makeup image based on the original image using a synthetic makeup transfer model.

Some examples of the method, apparatus, and non-transitory computer-readable medium further include blending the original image and the makeup image with a gradient mask to obtain a blended makeup image, where the parameters of the machine learning model are updated based on the blended makeup image.

FIG. 8 shows an example of GAN training according to embodiments of the present disclosure. The example shown includes generator 805 and discriminator 810. A GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network, i.e., to produce novel candidates that the discriminator network classifies as real. In training, the generator network generates false data, and the discriminator network learns the false data.

Referring to FIG. 8, at operation 800 (e.g., a sampling operation), a sample (e.g., real data) is generated from real images. The sample generated from the real images is the first input to discriminator 810. Discriminator 810 uses the real data as positive examples during training. In some embodiments, the operations of this step refer to, or may be performed by, a training component as described with reference to FIG. 2.

According to an embodiment, generator 805 receives random input and generates a sample (e.g., false data). The sample generated by generator 805 is the second input to discriminator 810. Discriminator 810 uses false data as negative examples during training.

In discriminator training, generator 805 is not trained. The weights of generator 805 remain constant while generator 805 generates examples for discriminator 810. In some embodiments, discriminator 810 is trained based on a generator loss. First, discriminator 810 classifies the real data and the false data generated by generator 805. Then, the discriminator loss is used to penalize discriminator 810 for misclassifying real data as false or false data as real. Next, discriminator 810 updates the weights of discriminator 810 through backpropagation from the discriminator loss through discriminator 810.

GAN training proceeds in alternating periods. For example, discriminator 810 is trained for one or more epochs and generator 805 is trained for one or more epochs. The training component as shown in FIG. 2 continues to train generator 805 and discriminator 810 in such a way.

FIG. 9 shows an example of a method for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps or are performed in conjunction with other operations.

At operation 905, the system identifies an original image depicting a face and a makeup image depicting the face with makeup. In some cases, the operations of this step refer to, or may be performed by, a machine learning model as described with reference to FIG. 2.

At operation 910, the system generates a scribble image based on the makeup image, where the scribble image includes a mask that indicates a portion of the original image for adding makeup to the face. In some cases, the operations of this step refer to, or may be performed by, a scribble component as described with reference to FIG. 2.

In some cases, the scribble image is generated based on a synthesized fake-makeup image and the original image. In some examples, a fake-makeup image is synthesized by leveraging key-point detection algorithms on both the reference image with makeup and the original image and applying perspective transformations on delta layers of areas of interest, for example, eyelash, eyeshadow, and eyebrow. In some embodiments, the machine learning model (e.g., as shown in FIG. 2) generates a difference image that depicts the makeup based on a difference between the original image and the reference image with makeup. The machine learning model then removes pixels from the difference image to obtain the scribble image. For example, the machine learning model takes the pixel-level difference between the original image and the fake-makeup image and applies a basic threshold to identify pixels that differ the most. The machine learning model then randomly selects a pre-defined number of pixels from the identified pixels and uses the identified pixels as a mask to extract relevant scribbles from the fake-makeup image. In some cases, the machine learning model performs dilation to increase the size of existing scribbles.

In some cases, the scribble image is generated based on the user's manual input. For example, a drawing interface configured to receive scribble input is provided to the user. The scribble input is the user's manual input which indicates colors for selected pixels, where the non-selected pixels remain black. In some cases, the colors indicated by the user in the scribble input is of the same format as colors in the scribble image. The scribble image including non-black pixels and black pixels is generated based on the user's manual input.

In some cases, the scribble image is generated based on the user's manual input that modifies a synthesized scribble image. For example, a synthesized scribble image may be generated by the system based on a synthesized fake-makeup image and the original image as described above. After that, the synthesized scribble is displayed and provided to the user via the drawing interface. The user modifies colors of selected pixels to indicate the color information of the makeup and the location information corresponding to the original image. For example, the user can add a color to some black pixels, delete the color of some non-black pixels, and change the color of some non-black pixels from one color to another.

According to some embodiments, a training dataset includes reference images with makeup, original images, and ground truth images. An original image depicts a face without makeup (e.g., a face of the user without makeup). A reference image with makeup depicts the desired makeup (e.g., an eyeshadow on a different face that the user wants to transfer to the original image). A ground truth image depicts the face with the desired makeup (e.g., the face in the original image with the desired makeup transferred thereto).

At operation 915, the system generates a target image depicting the face using a machine learning model based on the original image and the scribble image, where the target image includes the makeup in the portion indicated by the scribble image. In some cases, the operations of this step refer to, or may be performed by, a machine learning model as described with reference to FIGS. 3-5, and 8. In some cases, the system concatenates the original image and the scribble image as different channels of an encoder input. For example, the system encodes the original image along three channels to obtain a three-channel representation of the original image and encodes the scribble image along three channels to obtain a three-channel representation of the scribble image. After that, the system concatenates the three-channel representation of the original image and the three-channel representation of the scribble image to obtain a six-channel representation of the input. In this example, the six-channel representation of the input is used as an encoder input of a machine learning model. The system progressively down-samples the encoder input to the lowest layer of feature representation in a U-Net of a machine learning model. After that, the system up-samples the lowest layer of feature representation to obtain up-sampled feature representations. In this example, the up-sampled feature representations are also six-channel representations. The system generates the target image based on the six-channel decoder output of the machine learning model. In some cases, the system can skip connections in the U-Net of the machine learning model to directly shuttle relevant information between the input and the target image.

At operation 920, the system compares the target image and the makeup image. In some cases, the operations of this step refer to, or may be performed by, a training component as described with reference to FIG. 2.

At operation 925, the system updates parameters of the machine learning model based on the comparison. In some cases, the operations of this step refer to, or may be performed by, a training component as described with reference to FIG. 2. In some cases, the machine learning model is trained to generate a six-channel target image based on the concatenated three-channel original image and three-channel scribble image. However, the present disclosure is not necessarily limited thereto, and the number of channels may vary depending on the domain of the input and the output images.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
identifying an original image depicting a face;
identifying a scribble image indicating a color and a location for adding makeup to the face;
encoding, using an encoder of a machine learning model, the scribble image to obtain a feature representation of the makeup in a latent space of the machine learning model; and
generating a target image depicting the face using a decoder of the machine learning model based on the original image and the scribble image by decoding the feature representation, wherein the target image includes the makeup with the color and at the location indicated by the scribble image.

2. The method of claim 1, further comprising:
providing a drawing interface to a user; and
receiving a scribble input from the user via the drawing interface, wherein the scribble image is based on the scribble input.

3. The method of claim 2, further comprising:
resizing the scribble input based on a size of the original image to obtain the scribble image.

4. The method of claim 2, further comprising:
receiving a color input from the user, wherein the scribble image is based on the color input.

5. The method of claim 1, further comprising:
obtaining a mask that indicates a portion of the original image for adding the makeup to the face, wherein the makeup in the target image extends to pixels outside of the mask of the scribble image.

6. The method of claim 1, further comprising:
concatenating the original image and the scribble image as different channels of an encoder input;
encoding the encoder input to obtain the feature representation; and
decoding the feature representation to obtain the target image.

7. The method of claim 6, wherein:
the makeup comprises eyeshadow makeup and additional makeup comprises eyelash makeup.

8. The method of claim 1, wherein:
each pixel of the scribble image comprises color information of the makeup and location information corresponding to the original image.

9. The method of claim 1, further comprising:
identifying an additional scribble image comprising an additional mask that indicates an additional portion of the original image for adding additional makeup to the face; and
generating an additional target image depicting the face using the machine learning model based on the target image and the additional scribble image, wherein the additional target image includes the makeup and the additional makeup.

10. A method comprising:

identifying an original image depicting a face and a makeup image depicting the face with makeup;

generating a scribble image based on the makeup image, wherein the scribble image indicates a color and a location for adding makeup to the face;

encoding, using an encoder of a machine learning model, the scribble image to obtain a feature representation of the makeup in a latent space of the machine learning model;

generating a target image depicting the face using a decoder of the machine learning model based on the original image and the scribble image by decoding the feature representation, wherein the target image includes the makeup with the color and at the location in the portion indicated by the scribble image;

comparing the target image and the makeup image; and updating parameters of the machine learning model based on the comparison.

11. The method of claim 10, further comprising:

generating a difference image that depicts the makeup based on a difference between the original image and the makeup image; and removing pixels from the difference image to obtain the scribble image.

12. The method of claim 10, further comprising:

identifying a face image; and extracting an eye region of the face image to obtain the original image.

13. The method of claim 10, further comprising:

generating the makeup image based on the original image using a synthetic makeup transfer model.

14. The method of claim 13, further comprising:

blending the original image and the makeup image with a gradient mask to obtain a blended makeup image, wherein the parameters of the machine learning model are updated based on the blended makeup image.

15. An apparatus comprising:

a processor;

a memory including instructions executable by the processor;

a scribble component configured to generate a scribble image indicating a color and a location for adding makeup to a face in an original image;

an encoder of an image generation network configured to encode the scribble image to obtain a feature representation of the makeup in a latent space of the image generation network; and a decoder of the image generation network configured to generate a target image depicting the face in the original image based on the original image and the scribble image by decoding the feature representation, wherein the target image includes the makeup with the color and at the location indicated by the scribble image.

16. The apparatus of claim 15, wherein:

the image generation network comprises a U-Net architecture.

17. The apparatus of claim 15, wherein:

the image generation network comprises a first input channel corresponding to the original image and a second input channel corresponding to the scribble image.

18. The apparatus of claim 15, further comprising:

a drawing interface configured to receive a scribble input from a user, wherein the scribble image is based on the scribble input.

19. The apparatus of claim 15, further comprising:

a training component configured to update parameters of the image generation network.

20. The apparatus of claim 15, wherein:

the scribble component generates the scribble image based on the original image.

\* \* \* \* \*